(12) United States Patent
Cordebar

(10) Patent No.: US 6,729,793 B2
(45) Date of Patent: May 4, 2004

(54) ASSEMBLY OF TWO PIECES OF BODYWORK MADE OF PLASTICS MATERIAL FOR JOINING EDGE TO EDGE

(75) Inventor: Francis Cordebar, Veyziat (FR)

(73) Assignee: Compagnie Plastic Omnium, Lyons (FR)

( * ) Notice: Subject to any disclaimer, the term of this patent is extended or adjusted under 35 U.S.C. 154(b) by 14 days.

(21) Appl. No.: 10/061,176

(22) Filed: Feb. 4, 2002

(65) Prior Publication Data

US 2002/0119002 A1 Aug. 29, 2002

(30) Foreign Application Priority Data

Feb. 5, 2001 (FR) ............................................. 01 01521

(51) Int. Cl.$^7$ .......................... F16B 17/00; B60R 27/00
(52) U.S. Cl. ........................ 403/316; 403/315; 296/29; 296/198; 293/155
(58) Field of Search ................................ 403/279–282, 403/313–317, 326, 327, 329; 24/652, 653, 629, 16 PB, 487, 458, 573.09; 293/154, 155; 296/198, 29

(56) References Cited

U.S. PATENT DOCUMENTS

| | | | |
|---|---|---|---|
| 3,752,553 A | * | 8/1973 | Bildahl et al. .......... 403/326 X |
| 4,039,215 A | | 8/1977 | Minhinnick |
| 5,108,138 A | * | 4/1992 | Kawaguchi ............. 293/155 X |
| 5,622,444 A | * | 4/1997 | Gronnevik ................... 403/316 |
| 6,135,517 A | * | 10/2000 | Cordebar ..................... 293/155 |
| 6,490,767 B2 | * | 12/2002 | Haiduk ................. 24/16 PB X |
| 2002/0163216 A1 | * | 11/2002 | Delavalle et al. ............. 296/29 |

FOREIGN PATENT DOCUMENTS

| | | |
|---|---|---|
| EP | 0 779 183 A1 | 6/1997 |
| FR | 2 460 811 | 1/1981 |
| FR | 2 789 964 | 8/2000 |
| GB | 2 344 085 A | 5/2000 |

\* cited by examiner

Primary Examiner—Lynne H. Browne
Assistant Examiner—Ryan M. Flandro
(74) Attorney, Agent, or Firm—Oliff & Berridge, PLC

(57) ABSTRACT

An assembly of a first and a second pieces of bodywork of plastics material, each piece having an edge for coming into contact with an edge of another piece, wherein the edge of the first piece has a slot while the edge of the second piece has a tongue extending towards the first piece and suitable for penetrating into the slot, so as to cause an end portion of the tongue to project beyond the slot, the tongue being pierced by a through orifice situated in its end portion, one of the two pieces being provided with a cotter attached to the one of the two pieces by a deformable link which enables the cotter to be engaged in the through orifice of the tongue once the tongue has been inserted in the slot, thereby retaining the tongue in the slot.

9 Claims, 4 Drawing Sheets

ASSEMBLY OF TWO PIECES OF BODYWORK MADE OF PLASTICS MATERIAL FOR JOINING EDGE TO EDGE

BACKGROUND OF THE INVENTION

1. Field of Invention

The present invention relates to an assembly of two pieces of bodywork made of plastics material for joining edge to edge.

2. Description of Related Art

It is becoming more and more necessary for pieces of bodywork to be exactly positioned relative to each other in order to ensure that the appearance of a vehicle is satisfactory.

In this respect, various solutions have already been devised that consist in fixing each piece of bodywork accurately on the structure of the vehicle, while ensuring that adjacent pieces of bodywork benefit from fixing points that are adjacent or indeed identical at their contiguous edges.

The fastenings used in those solutions need to be relatively strong, since they serve to support the pieces of bodywork while also ensuring that they are properly in register.

Such fastenings are generally constituted by separate fasteners, often made of metal, and this gives rise to problems of cost, both in terms of procurement and in terms of labor.

More generally, adding metal or any other material different from that constituting the pieces of bodywork makes them more difficult to recycle.

SUMMARY OF THE INVENTION

The present invention seeks to provide a novel assembly of two pieces of bodywork which can be assembled together without requiring any external fastener and which ensures that the two pieces are positioned relative to each other with great accuracy.

The present invention provides an assembly of two pieces of bodywork of plastics material, each piece having an edge for coming into contact with an edge of the other piece, the assembly being characterized in that the edge of one of the pieces has a slot while the edge of the other piece has a tongue extending from the other piece and suitable for penetrating into said slot, so as to cause an end portion of said tongue to project beyond the slot, said tongue being pierced by a through orifice situated in its end portion, the other piece being provided with a cotter attached to said other piece by means of a deformable link which enables said cotter to be engaged in the through orifice of the tongue once the tongue has been inserted in the slot, thereby retaining the tongue in the slot.

In the invention, the term "cotter" is used to designate a piece that penetrates into the through orifice of the tongue in order to hold it in the slot.

It will be understood that the invention provides simple means for holding the edges of the two pieces in register in a manner that is simultaneously robust, simple, and quick, and without requiring any separate piece to be fitted.

As a result, it is easier to recycle the bodywork pieces, since the portions interconnecting them are made of the same material as the remainder of the pieces of bodywork.

In addition, because the pieces of bodywork of the invention are made of plastics material, obtaining a pierced tongue on one of them, and the slot and the cotter on the other one of them requires no more than suitable arrangements of the molds in which said pieces are made, and this is true of any molding technique that might be employed.

Nevertheless, in the invention, it is advantageous to shape the cotter and its deformable connection in such a manner as to avoid making the operation of unmolding the molded pieces more complicated. In other words, it is appropriate to ensure that the piece that includes the cotter does not require an undercut to be used merely because of the presence of said cotter.

In a particular embodiment of the invention, the connection connecting the cotter to the piece of bodywork which carries it begins in the vicinity of the slot and is shaped to form a strap suitable for being folded over so as to enable the cotter to penetrate into the through orifice in the tongue.

Preferably, the cotter comprises an insertion head of conical or prismatic shape enabling it to be guided during engagement in the through orifice, and a body of smaller thickness situated downstream from its head (in the direction for insertion into the through orifice). Because of the change in thickness relative to the body, the insertion head forms a retaining shoulder which holds the cotter in the insertion orifice after said insertion head has been pushed through with a small amount of force.

In addition, because of this body of reduced thickness, once the cotter is in place, the stresses imposed on the tongue while the insertion head is passing through are relaxed, thereby preserving the pieces of bodywork from the undesirable local deformation that could result from such stresses in the long run.

In a particular embodiment, in which each edge of a piece has a side face for making contact with the other edge, at least one of the pieces is provided with wedges cooperating with the corresponding contact side face to form a corner for receiving the edge of the other piece.

These wedges provide positioning in two perpendicular directions along the corner edge, e.g. in the X direction (longitudinally) and in the Y direction (transversally) relative to the vehicle if the corner edge is substantially vertical.

When both pieces have such wedges, the wedges are preferably arranged in a staggered configuration so as to avoid interfering with each other and they are offset towards the inside of the vehicle so as to pass behind the contact face of the other piece.

In a preferred variant, the staggered wedges are dimensioned on the two pieces of bodywork in such a manner that two adjacent wedges, each belonging to respective one of the pieces, lie close to each other when the two pieces are assembled together. In this way, the wedges also define relative positioning of the two pieces in a third direction parallel to the corner edge, and consequently perpendicular to the two above-mentioned directions.

The wedges are preferably prismatic in shape, the small base lying at the end of the wedge, thereby facilitating the approach between the two pieces of bodywork by acting as positioning guides along said third direction.

In a particular embodiment, the cotter is provided with a stub making it easier to insert into the through orifice of the tongue by providing a bearing surface, for example for the thumb of an operator or for a pair of pliers. Said stub preferably extends parallel to the tongue when the cotter is inserted in the through orifice. Thus, it is possible to bear against the tongue and the stub so as to move them towards each other, clamping one against the other, or so as to separate them, e.g. by inserting a screwdriver between them and using it as a wedge.

In a particular embodiment of the invention, the two pieces of bodywork comprise firstly a bumper, and secondly a fender or a piece of fender trim.

BRIEF DESCRIPTION OF THE DRAWINGS

Embodiments of the invention are described below to make the invention easier to understand and with the help of the accompanying figures, in which.

DETAILED DESCRIPTION OF PREFERRED EMBODIMENTS

Figure 1:
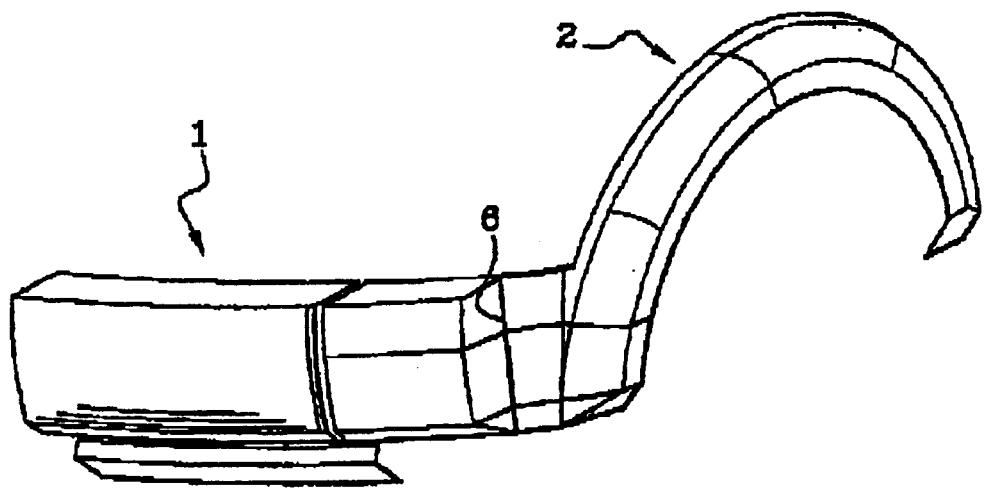
FIG. 1 is a perspective view of a front left portion of a bumper and a piece of front left fender trim shown assembled together.

FIG. 1 shows a bumper 1 and a piece of fender trim 2 which are to be connected together accurately via adjacent edges 6 and 8. These edges join together relatively low down relative to the vehicle at a location where there is no structural member for providing fastening.

The fender trim 2 covers the entire margin of the fender following the top half of the wheel arch, and it joins the bumper 1 in front of the wheel.

The bumper 1 comprises an internal shock-absorbing structure 3 which can be of any kind, together with an outer skin 4.

At each of its lateral ends, the outer skin 4 is terminated by a rim 5 extending in the longitudinal direction of the vehicle, and having an edge 6 pointing towards the fender.

The fender trim 2 is extended forwards by a rim 7 that extends substantially transversally across the vehicle, and that is terminated by an edge 8 pointing towards the bumper.

Figure 2:
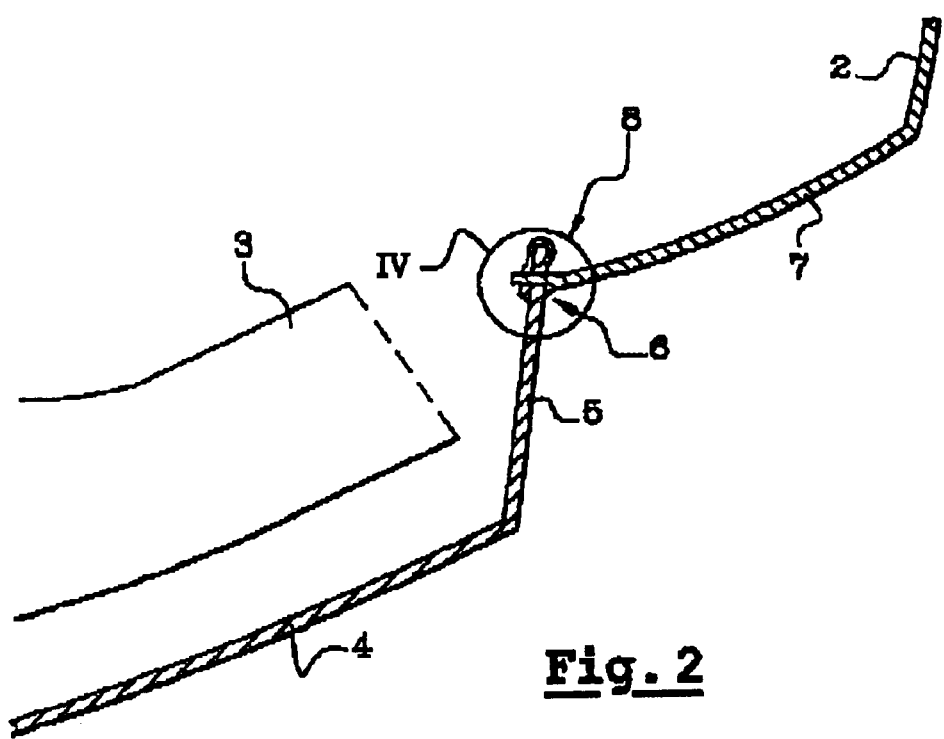
FIG. 2 is a horizontal section through the two pieces shown in FIG. 1.
Figure 3:
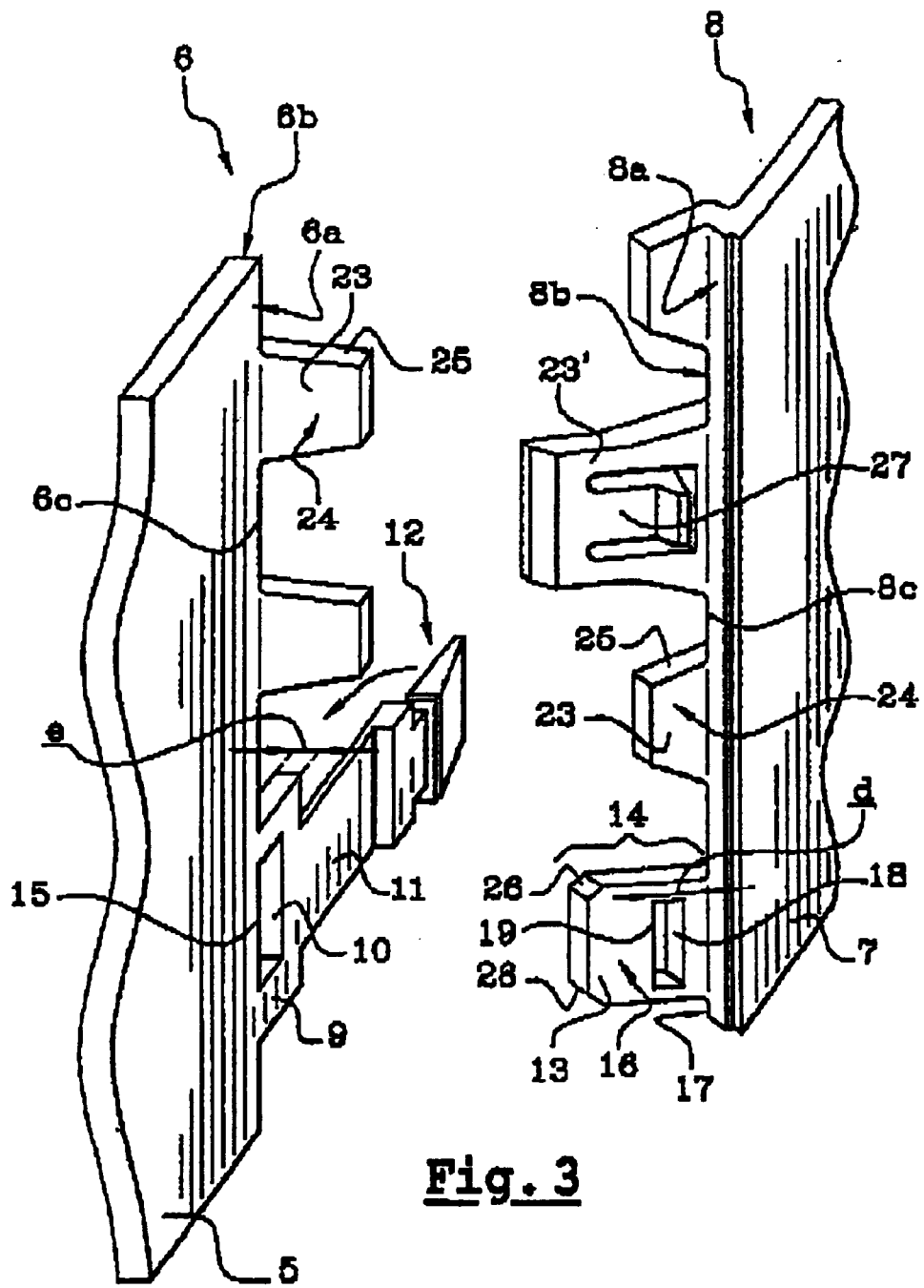
FIG. 3 is a close-up view in perspective of the facing edges of the bumper skin and of the front fender trim prior to being assembled together.

The above-defined edges 6 and 8 of the bumper skin and of the fender trim, referred to below as the skin 4 and the fender 2, are connected together in a region IV (FIG. 2) shown in close-up in the sections of FIGS. 4 and 5, but of a structure that can be seen more clearly in the perspective view of FIG. 3.

The edge 6 of the skin 4 has a projection 9 extending said skin, and having a slot 10 of rectangular section formed therein. Said projection 9 is extended by a strap 11 of plastics material formed integrally with the skin and of small thickness so as to be deformable, in particular so as to be suitable for being rolled up.

The strap of plastics material terminates in a cotter 12 of shape that is described below.

The edge 8 of the trim 2 has a tongue 13 in register with the rectangular section slot 10, the tongue 13 extending towards the skin and being of section that is slightly smaller than that of the slot.

This tongue is long enough to ensure that when inserted in the slot, it has an end portion 14 that projects beyond the other side of the skin, i.e. beyond said slot.

The slot 10 is positioned in the projection 9 in such a manner that its front edge 15 (i.e. its edge remote from the cotter 12) is in alignment with the corner edge 6c at the edge 6 of the skin. On the trim, the tongue 13 is likewise positioned in such a manner that its front face 16 for bearing against the front 15 of the slot is in line with the hidden rear face 17 of the trim.

Thus, with reference to the contacting side faces 6a and 8a of the two edges and the hidden rear faces 6b and 8b thereof, these two faces on each part form a corner whose corner edge 6c, 8c is intended to coincide with the corner edge of the other piece.

The tongue 13 has a through orifice 18 of rectangular section, situated at least in part its end portion 14, i.e. so that its front 19 is positioned at a distance d from the corner edge 6c that is not less the thickness e of the projection 19 that includes the slot 10.

Figure 4:
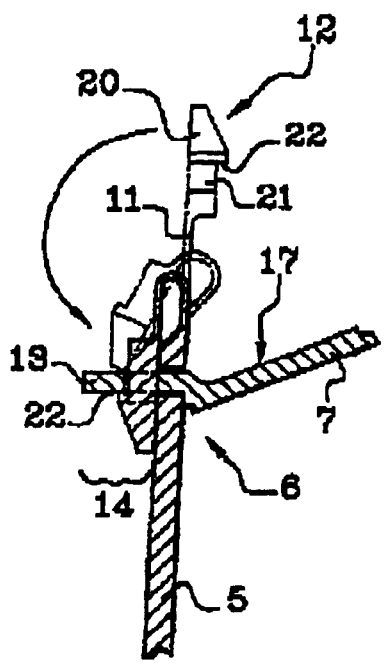
FIG. 4 is a close-up view of portion IV in FIG. 2.
Figure 5:
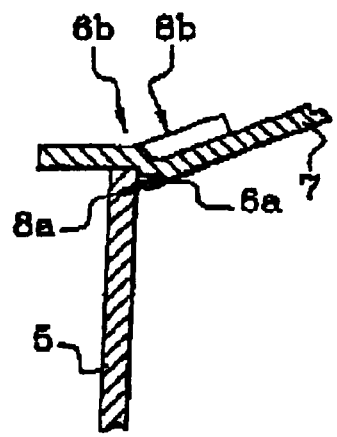
FIG. 5 is a section analogous to that of FIG. 4, on a parallel plane offset therefrom.

In this way, when the tongue 13 is inserted in the slot 10, the edge 8 of the trim coming into contact with the edge 6 of the skin, the through orifice 18 in the tongue lies on the other side of the projection, flush with its face remote from the edge of the fender, as can be seen in FIG. 4.

The cotter 12 situated at the end of the thin strap 11 can then be brought into register with the through orifice 18 by deforming the strap, ready to insert the cotter into the orifice.

The cotter 12 has a prismatic head 20 whose small base is situated at its free end and whose large base is of a thickness slightly greater than the thickness of the free section of the through orifice 13 that projects beyond the projection 10. In other words, if the through orifice is partially masked by the projection, lying in the thickness thereof, then the free section in question corresponds to the section of the through orifice minus that portion of its section which lies within the thickness of the projection.

Downstream from its prismatic head, the cotter 12 has a body 21 of smaller thickness such that the large base of the prismatic head forms a shoulder 22 that serves to retain the cotter in the through orifice.

It will be understood that when the cotter is inserted, the tongue is subjected to traction so as to enable the large base of the prismatic head to pass through, but that this traction disappears when the body of the cotter replaces the prismatic head in the through orifice, with the head projecting beyond the other side of the tongue.

The assembly built up in this way constitutes a lock which guarantees that contact is maintained between the skin and the trim.

In addition, since the facing edges of the two pieces are rectilinear, they have arrangements for improving relative positioning therebetween.

Firstly, each edge has wedges 23 in the form of teeth projecting towards the other edge from the hidden face 6b, 8B of each piece.

Each tooth 23 has a visible face 24 which cooperates with the contacting side face 6a, 8a of the corresponding edge to define a wedge serving as a bearing point for the edge of the other piece so as to position it in two mutually perpendicular directions that are also perpendicular to the two edges, i.e. longitudinally (X direction) and transversally (Y direction) in the drawing.

In addition, the teeth 23 on the two pieces are disposed in a staggered configuration so as to be interleaved when the two pieces are brought together. The width of the teeth and the width of the gap left empty between them on either piece correspond respectively to the width of the gaps left between two adjacent teeth and the width of the teeth on the other piece. Thus, when the edges of the two pieces are in contact, the tooth-shaped wedges serve not only to provide positioning along the two above-mentioned directions, but also to provide accurate perpendicular positioning along the edges, i.e. vertically (in the X direction in the drawing).

The teeth 23 are in the form of prisms so that the two pieces can be presented to each other while coarsely positioned, with the sides 25 of the wedges then sliding over one another so as to guide the two pieces into accurate relative positioning enabling the tongue to penetrate into the slot.

It should also be observed that chamfers 26 are provided on the tongue to make it easier to engage in the slot.

Finally, some of the teeth (only one tooth 23' in FIG. 3) include a respective retaining clip in the form of an elastically deformable tab 27 cut out in the thickness of the tooth suitable for snap-fastening against the edge of the other piece in order to pre-position the two pieces ready for closing the lock.

Figure 7:
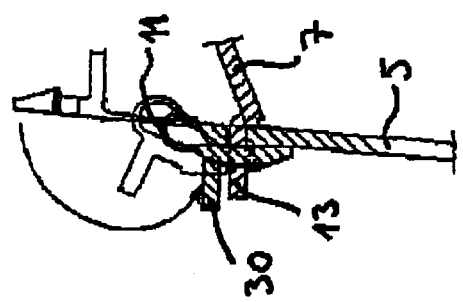
FIG. 7 is a view analogous to FIG. 4, showing the FIG. 6 variant.
Figure 6:
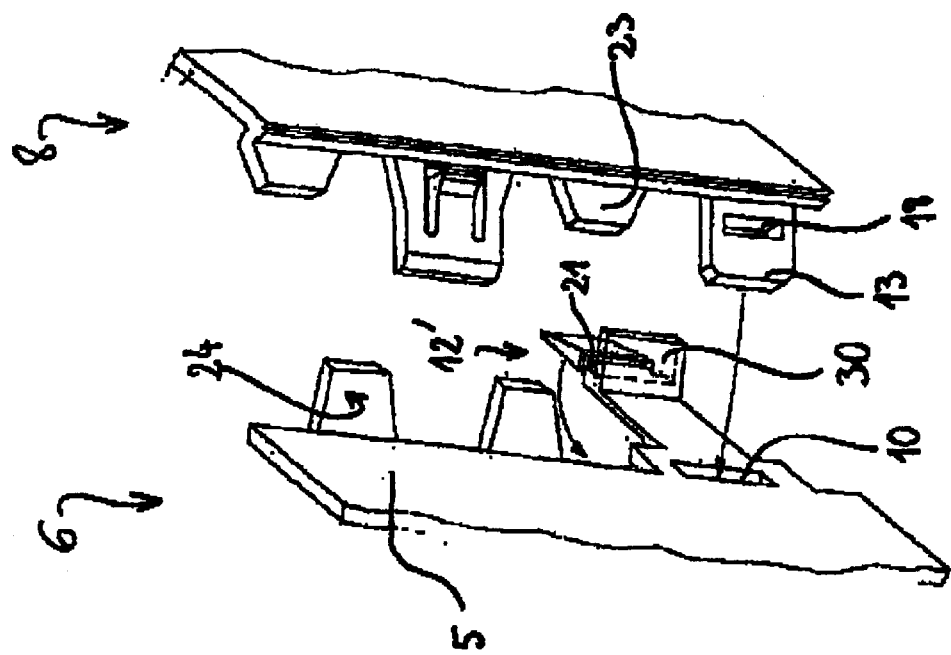
FIG. 6 is a view analogous to FIG. 3, showing a variant.

In the variant shown in FIGS. 6 and 7, the same references are used for portions of the drawing that are identical to portions described above. The cotter 12' is provided with a stub 30 extending perpendicularly from its base 12'a, immediately in front of the body 21 of smaller thickness.

As can be seen in FIG. 7, the stub 30 lies parallel to the tongue 13 during engagement of the cotter in the through orifice in the tongue.

This provides a bearing surface that makes it easier to engage the cotter. For example, the stub 30 and the tongue 13 can be clamped between the two jaws of a pair of pliers (not shown). Similarly, it is easy to move the stub 30 away from the tongue 13, e.g. by inserting a screwdriver between them and then moving them apart, thereby enabling the cotter to be withdrawn from the orifice in the tongue.

Naturally, the embodiments described above are not limiting in any way and can be modified in any desirable manner without thereby going beyond the ambit of the invention.

In particular, it is not necessary in the invention for the slot and the through orifice to be closed. Although most likely less effective, open shapes for holding the tongue and/or the cotter in the above-defined positions could be considered in the meaning of the present invention as constituting a through orifice and a slot.

What is claimed is:

1. An assembly of a first piece and a second piece of bodywork of plastics material, each piece having an edge for coming into contact with the edge of the other piece, wherein the edge of the first piece has a slot while the edge of the second piece has a tongue extending towards the first piece and suitable for penetrating into said slot, so as to cause an end portion of said tongue to project beyond the slot, said tongue being pierced by a through orifice situated in its end portion, a cotter being attached to one of the two pieces by means of a deformable link which enables said cotter to be engaged in the through orifice of the tongue once the tongue has been inserted in the slot, thereby retaining the tongue in the slot.

2. The assembly according to claim 1, wherein the cotter comprises an insertion head of conical or prismatic shape enabling it to be guided during engagement in the through orifice, and a body thinner than the insertion head, the body being situated in the orifice when the cotter is engaged in the through orifice.

3. The assembly according to claim 1, in which the edge of each piece has a contact face for making contact with the other edge, wherein at least one of the pieces is provided with wedges cooperating with the corresponding contact face to form a corner for receiving the edge of the other piece.

4. The assembly according to claim 3, wherein the wedges are arranged in a staggered configuration so as to avoid interfering with each other and being offset towards the inside of the vehicle so as to pass behind the contact face of the other piece.

5. The assembly according to claim 3, wherein the wedges have a cross sectional area which decreases from the base to the end of the wedge, thereby facilitating the approach between the two pieces of bodywork by acting as positioning guides parallel to an edge of the corner.

6. An assembly according to claim 1, wherein the cotter is provided with a stub making it easier to insert into the through orifice of the tongue by providing a pressing surface, said stub preferably extending parallel to the tongue when the cotter is inserted in the through orifice.

7. An assembly according to claim 1, wherein the two pieces of bodywork comprise firstly a bumper, and secondly a fender or a piece of fender trim.

8. An assembly of a first piece and a second piece of bodywork of plastics material, each piece having an edge for coming into contact with the edge of the other piece, wherein the edge of the first piece has a slot while the edge of the second piece has a tongue extending towards the first piece and suitable for penetrating into said slot, so as to cause an end portion of said tongue to project beyond the slot, said tongue being pierced by a through orifice situated in its end portion, a cotter being attached to one of the two pieces by means of a deformable link which enables said cotter to be engaged in the through orifice of the tongue once the tongue has been inserted in the slot, thereby retaining the tongue in the slot, the deformable link connecting the cotter to the piece of bodywork which carries it begins in the vicinity of the slot and is shaped to form a strap suitable for being folded over so as to enable the cotter to penetrate into the through orifice in the tongue.

9. An assembly of a first piece and a second piece of bodywork of plastics material, each piece having an edge for coming into contact with the edge of the other piece, wherein the edge of the first piece has a slot while the edge of the second piece has a tongue extending towards the first piece and suitable for penetrating into said slot, so as to cause an end portion of said tongue to project beyond the slot, said tongue being pierced by a through orifice situated in its end portion, a cotter being attached to said-one of the two pieces by means of a deformable link which enables said cotter to be engaged in the through orifice of the tongue once the tongue has been inserted in the slot, thereby retaining the tongue in the slot, staggered wedges provided on the two pieces of bodywork and being dimensioned in such a manner that two adjacent wedges, each belonging to a respective one of the pieces, lie close to each other when the two pieces are assembled together.

* * * * *